Norman L. Chalfin
INVENTOR.

TIME-CONTROLLED SIGNAL ACTUATED SWITCH FOR A SLIDE PROJECTOR

Filed July 13, 1964

Norman L. Chalfin
INVENTOR.

United States Patent Office 3,276,315

Patented Oct. 4, 1966

3,276,315

TIME-CONTROLLED SIGNAL ACTUATED SWITCH FOR A SLIDE PROJECTOR

Norman L. Chalfin, 460 San Juan Place, Pasadena, Calif.

Filed July 13, 1964, Ser. No. 381,989
8 Claims. (Cl. 88—28)

This invention relates to signal actuated control mechanisms and, more particularly, to a signal actuated control mechanism the duration of the switch closure of which is settable to guarantee a single-trip slide projector control actuated from recorded signals generated by the mechanism and recorded on a recording medium, or by which a tape recorder may be operated in response thereto.

In my U. S. Patent No. 3,110,216, issued November 12, 1963, and entitled Automatic Slide Projector Program Control, I have described and claimed a slide projector control mechanism actuated by recorded signals generated by the therein described mechanism.

In the course of using this mechanism in its generator mode of operation, it was found that when the oscillator key was actuated, and held down for longer than the period required for a change cycle, the automatic control device of the slide projector changing mechanism would repeat and more than one slide was projected in a program interval intended for only one slide.

That there is also a general condition of the prior art automatic slide control signal generator devices is evidenced by the fact that each of the manufacturers of such devices now on the market have incorporated in their operating instructions a warning note to the effect that more than a single slide change will result if the tone generator or push-button is held down too long. Alternatively, if the tone generator key were held down for too short a period, no slide change will occur at all. In either event, the purpose of the use of a tape recorded tone signal with commentary is thereby lost since the commentary will no longer be in synchronism with the slide sequence being projected under the control of the recorded tone signals.

This invention contemplates improvements in the means for generating a tone signal to be recorded with voice commentary when preparing a sound-slide synchronized program. With the novel arrangement of the present invention not only will there be only one slide tripping signal generated for each operation of the tone generator key, but also when the device is used in its playback mode for the presentation of the recorded commentary and slide sequence, only one slide at a time can be changed by the slide change control mechanism of this invention as a result of one tone received from the playback instrument. Additionally, in the "playback" mode, the device may be used to actuate a tape recorder or other recorder each time a tone is received or speech is spoken into a microphone.

As has been described in the above-mentioned patent, the mechanism devised for the programming of a sequence of slides together with voice commentary may include a vacuum tube or transistor amplifier and a relay control device. The amplifier is normally responsive to signals received from a recorded signal in a sound reproducing system for either magnetic tape or discs to actuate the relay control device which, in turn, operates the automatic slide projector to change a slide. The amplifier described in said patent is connected to a switching mechanism such that in one position thereof the device is in its generator mode from which position the switch may be moved as a momentary key or lever to generate a tone signal each time when, for illustration of the commentary, a slide change is sought. This tone continues as long as the key is held down and terminates as soon as the key is released. It is, therefore, possible in the prior art devices to hold the key down for a period of time in excess of the slide changing cycle which results in the continuation of the changing cycle and a new slide being projected with each change. It is only when the switch is held for the correct period of time that only one slide change occurs with these prior art systems.

The above mentioned switch has a "playback" position in which the tone generator is de-energized and the amplifier energized whereby the tape recording device then becomes a playback device. The unit is thus the control mechanism which is in turn connected to the slide projector changing mechanism to change a slide each time the tone recorded on the recording medium is detected by the amplifier of the device. One feature of the device in the above described U. S. patent was its use of a common element that becomes both oscillator and amplifier in the respective record and playback modes of operation of the apparatus. This is actuated by a single switch that performs the mode changeover function and the tone-signal keying function.

In the improvement contemplated herein the same common use is made of switching elements for the several modes of operation. In the keying and playback modes of operation a novel arrangement of elements is employed to prevent more than one slide change for each switch operation. By the action of the novel means of this invention there will be only one slide changed no matter how long the operating key is held depressed during the oscillation keying function in what has been called the "recording" mode of the device. An added feature of the present invention is an indicator which shows the duration of the tone in either playback or recording modes. In its "playback" mode the present invention serves as a voice or tone actuated relay also.

Accordingly, it is an object of this invention to provide an automatic slide projector control signal generating and detecting device for automatically changing slides in response to recorded tone signals and which will record a tone of only a predetermined duration regardless of how long the actuating key thereof is depressed.

It is another object of the invention to provide in a slide projector control device actuated by a recorded signal, means for responding to the recorded signals wherein a predetermined signal duration cannot be exceeded and includes means for adjusting the duration for various requirements despite the fact that the initially recorded pulses may have been of different duration.

It is still another object of the invention to provide a combined generator of a time-controlled signal for recording on a tape and a responder for such a signal which will only utilize so much of the signal as is necessary for operation of the utilization devices thereof and no more, or conversely, despite the short duration of initially recorded pulses, may be adjusted to respond for longer than the original durations.

It is an even further object of the invention to provide a tone or voice actuated relay device which operates to close instantaneously, but which may be adjusted for a delayed interval before opening again.

These and other objects of this invention will be better understood from thee description of the accompanying figures which follow, taken together with the appended claims.

Figures 1, 2:
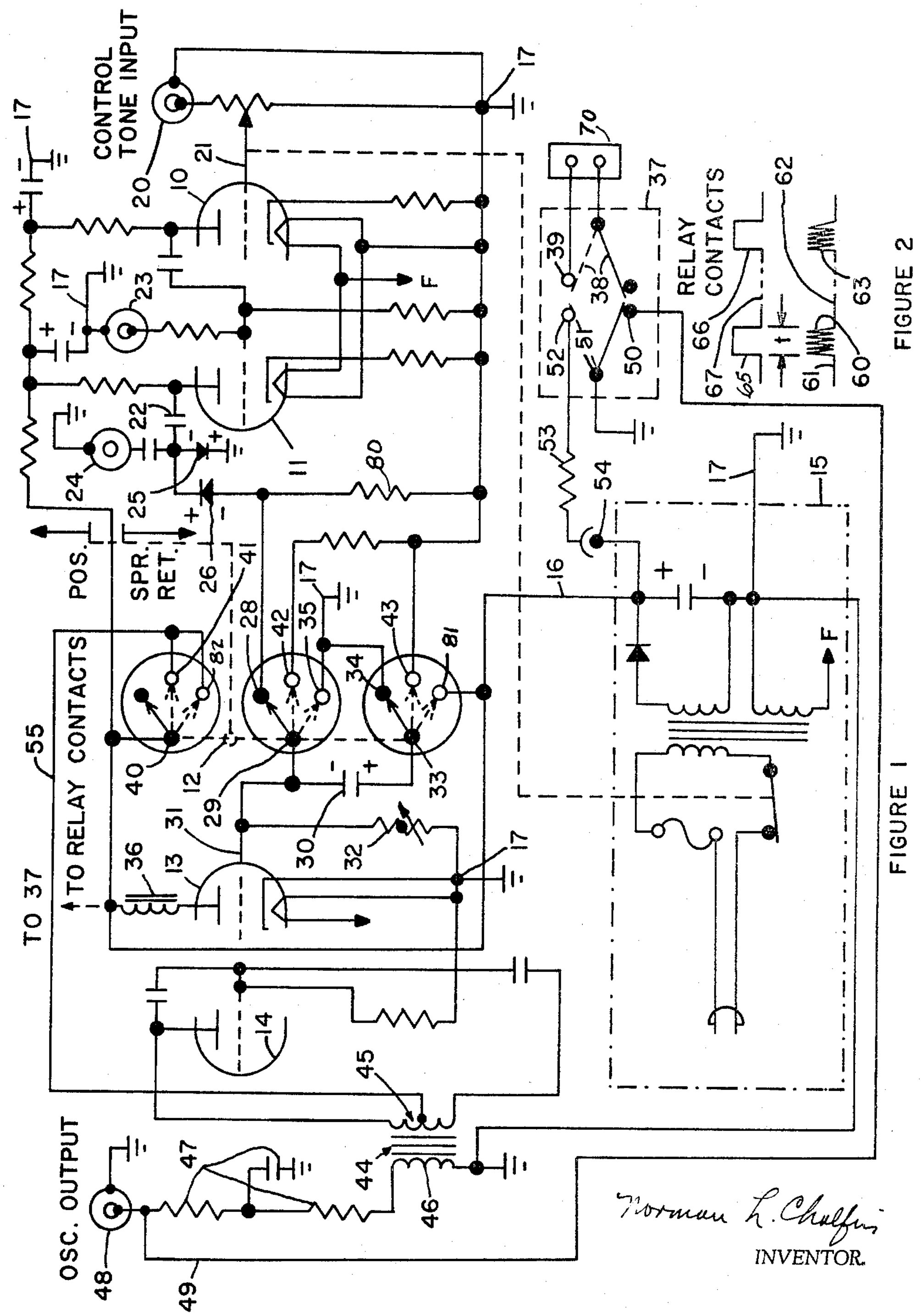
FIGURE 1 is a schematic circuit diagram of a vacuum tube embodiment of this invention.
FIGURE 2 is a series of waveforms describing the operation of the invention.

Referring now to FIGURE 1, the vacuum tube form of circuit of the invention may be seen to include a signal or tone amplifier triodes 10 and 11 wired in a generally conventional configuration for a cascaded two-stage amplifier, a three-pole-three-position switch 12, a relay triode 13 and an oscillator triode 14. The two stages 10 and 11 of the amplifier may be in a common envelope such as the dual triodes 12AU7 and 12AX7 or their homologues. Likewise, relay triode 13 and oscillator triode 14 may be in a common envelope and also a 12AU7 or, as shown in the figure, a 6J6. The circuit also includes a source of power derived from a rectifier power supply shown in the dashed block 15.

The power supply 15 illustrated is a conventional half-wave rectifier supply but may be a bridge supply or any other that may be thought of by one skilled in this art as suits the needs of the vacuum tubes or transistors used in the circuit.

Alternatively, amplifier triode stages 10 and 11 may be transistor amplifiers in their appropriate comparable circuit configurations.

From power supply lead 16 positive D.C. (+) potential is supplied to the circuits as needed. The (−) negative return of the power supply 15 goes to ground connection 17.

The solid line switch arms connected at 40, 29 and 33, respectively, represent one of the positive connection positions of three-pole-three-position switch 12 when moved in the direction shown by the arrow POS. from the center positions of arms 40, 29 and 33 shown in dashed lines. The arrow shown at SPR. RET. indicates the direction of movement of the switch arms 40, 29 and 33 for a momentary connection as shown by the lower dashed line representation thereof on switch 12.

Positive contact of switch arm 29 is made to contact 28 in the upper POS. position and in that same position arm 33 is connected to contact 34. In the upper POS. position, arm 40 makes no connection since in that position the contact is open. Contact 28 is connected to the anode of a diode 26 and load resistor 80. The other end of load resistor 80 is grounded at 17. Contact 34 is grounded at 17. Thus in the position of switch 12 above described a capacitor 30 connected between arms 28 and 33 is connected from the anode of diode 26 to ground. Capacitor 30 is polarized so that its negative terminal is at arm 29 and grid 31 of relay tube 13 and its positive terminal is at arm 33 and grounded through contact 34.

The position POS., above described connects the circuits for the tone responsive control operation or "playback" mode of operation of the projector control system of this invention.

In this position, an alternating current tone signal from any source such as a microphone, phonograph record player, tape recorder, or radio receiver is applied to CONTROL TONE INPUT terminal 20 for application to two-stage amplifier 10–11. The level of the applied signal can be adjusted by the gain control arm at 21 on the grid of amplifier 10. Alternatively, an input tone signal of higher level may be applied at input terminal 23 to the second amplifier stage 11. The amplified output signal applied at either 20 or 23 is coupled through capacitor 22 to the cathode of diode 25. The cathode of diode 26 is connected to the anode of diode 25. This configuration of diodes 25–26 forms a voltage doubler rectifier delivering to capacitor 30 through switch contacts 28–29 and 33–34 a D.C. potential which charges capacitor 30 in the polarity shown—that is, negative at grid 31 and positive at ground.

The specific resistors and capacitors interconnecting ampyifiers 10 and 11 with one another, the power supply lead 16, and ground 17, are not set forth in detail, since such items are well-known to the art and the values thereof can be chosen in many degrees thereof depending on the specific amplifier tubes used and tone or signal levels anticipated. Such details are well-known to those skilled in the art of employment of vacuum tube or transistor amplifiers.

Relay triode 13 actuates relay coil 36 connected in the anode circuit thereof. The contacts of relay coil 36 are shown at dashed box 37. In the absence of any signal, triode 13 is so connected with respect to grid leak 32 in the grid circuit 21 thereof and cathode thereof connected to ground at 17 that current normally flows in relay coil 36 causing the relay arm 50 thereof to be connected to contact 50 and arm 38 to be connected to an open lead. When the D.C. potential resulting from a signal applied at inputs 20 or 23 charges up capacitor 30, the charge stored therein places a negative potential between grid 31 and ground sufficient to bias relay triode 13 to cut-off and current flow ceases in relay coil 36. This results in relay arms 51 and 38, respectively, being connected in the dashed positions shown to contacts 52 and 39, respectively. Relay terminal 38 and 39 are thereby closed to actuate any device connected at 70. Such a device 70 may be a recording start control of a tape recorder or the change actuation switch for a slide projector, or the actuating device of any other instrument which it is desirable to actuate in response to a signal such as from a microphone, radio, phonograph recording, tape recording or any other alternating current signal source of any frequency to which the amplifiers 10–11 may be designed to respond.

Thus, each time such signals are applied to the amplifier 10–11 input circuit at 20, capacitor 30 charges up to cut-off triode 13, closing relay contacts 51–52 and 38–39. Arm contact 51 is grounded in the 51–52 position thereof. The ground completes the circuit from lead 16 (B+) to neon indicator 54 and current limiting resistor 53 connected in series therewith. Thus, each time relay contacts 51–52 are closed, indicator 54 glows for the duration of the closure.

The duration of closure of the relay contacts 51–52/38/39 is determined by the $R \times C$ times for discharge of capacitor 30 through resistor 32. Resistor 32 is in part adjustable so that a predetermined closure duration may be set by adjusting the adjustable portion of resistor 32.

When the control system of this invention is used to turn on a tape recorder the resistance of 32 is generally made larger so that once the desired sound has ceased there will not be an abrupt shut-off of the recorder by the immediate opening of contacts 38-39 upon termination of the signal. Instead, there is a sufficient delay so that if this invention is used in connection with the automatic intermittent recording of speech sounds (voice operated relay) breathing pauses of the speaker will not result in abrupt stops in the recording. Such use is best considered in connection with office dictation or telephone conversation recording.

When the control system of this invention is employed for slide projector control in response to prerecorded or radio transmitted signals the duration of closure of contacts 38–39 can be adjusted by resistor 32 to provide sufficient time for the mechanism to trip but less than the duration of a complete slide change cycle.

One commercial automatic slide projector now being marketed by Bausch and Lomb, of Rochester, New York, is so devised that a short pulse actuates the motor thereof for forward advance of a slide cartridge therein. A longer duration causes reversal of the cartridge. Thus, with the duration of the recorded tones appropriately adjusted both forward and reverse operation of the projector is possible in the same sequence by the resulting different durations of a recorded tone.

The creation of tones for recording is accomplished when switch 12 is in the dashed position 40–41, 29–42 and 33–42. From this position switch 12 may be momentarily moved in the SPR. RET. arrow direction to contact positions 33–81, 29–35 and 40–82 from which, by spring action, it returns to the 40–41, 29–42 and 33–43 positions on release. Such switches are well known in the art. One such switch is made by Centralab and designated by their catalog number 1449.

For the following discussion, the position of switch 12 shown as 40–41, 29–42 and 33–43 is described as "RECORD" and the momentary position 33–81, 29–25 and 40–82 is described as "KEY."

When switch 12 is in "RECORD" position oscillator tube 14 is activated by the application thereto of B+ voltage through the center tap 45 of the primary of transformer 44. The B voltage is derived from power supply 15 through line 16 and through lead 55 and contacts 41 and 40 of switch 12. The circuit configuration of tube 14 is shown as in the well-known Hartley oscillator, the primary 45 of transformer 44 forming the oscillator inductance winding. The inductance value of winding 45 and the resistors and capacitors interconnecting the various parts of the winding 45 to tube 14 are not identified in detail since these may be chosen to produce any desired frequency of oscillation.

In the record position of switch 12, above described, oscillator 14, being activated, continues to oscillate and generate an appropriate signal which is induced to secondary 46 of transformer 44. Since with switch 12 in this (record) position relay 36 is still engaged and therefore contacts 50 and 51 are closed thereby grounding line 49, there will be no output at OSC. OUTPUT terminals 48. The oscillation developed in winding 46 will be dissipated in resistance-capacitance network 47. The dissipation of the signal by network 47 when appropriate values are chosen does not load the winding 46 excessively so that the direct shorting of output 48 by relay contacts 50–51 can occur without overloading and thus destroying winding 46.

When switch 12 is moved to the KEY position identified by arrow SPR. RET., capacitor 30 is placed across the B-supply to be charged in accordance with its normal polarity. That is negative terminal 29 is grounded to contact 34. Positive terminal 33 connects to positive potential source 16 through switch contact 81. When switch 12 is released after having been momentarily placed in KEY position, switch contact 29 connects to terminal 42 and 33 connects to 43 which is grounded, thus placing the charge just applied to capacitor 30 across the resistor connected between terminals 42 and 43 and across resistor 32 between grid 31 and ground in relay tube 13. Thus, the negative end of capacitor 30 is at grid 31 and the positive end at ground. The negative charge with respect to ground thereby applied to grid 31 of relay tube 13 cuts off the plate current at tube 13 and de-energizes relay coil 36 causing contact 51 to move to terminal 52 and contact 38 to move to terminal 39. This results in two simultaneous events. (1) The oscillation signal in winding 46 is applied to output terminal 48 to be recorded on a recording means connected to output terminal 48, (2) and the closure of contacts 38–39 actuates a projector slide change mechanism connected to terminals 70. The closure at 70 and signal at 48 continuing for the period of time determined by the $R \times C$ product of the value of capacitor 30 (C) and the net resistance R of resistor 32 connected in parallel with capacitor 30 and that connected between terminals 42 and 43 of switch 12.

The time duration is adjusted by varying resistor 32 by its adjustable element.

The output condition at terminal 48 and closure of relay contacts 38/39 is illustrated by the waveform 65–66–67 and 60–61–62 shown at lower right of FIGURE 2. The signal output at terminal 48 is shown at 60 and 63. The closed or grounded condition of terminal 48 is shown at 61 and 62. The duration of signals 60/63 can be seen to correspond to "*t*" equal to the closed condition of terminals 38/39 at 70 shown in the waveform diagram at 65 and 66.

A third event which occurs during the closure interval "*t*" is the illumination of neon lamp 54 by the closing of contact 51 to 52 completing the circuit of neon lamp 54 to ground. The lamp 54 thereby indicates that relay 36 has been de-energized, the condition desired for actuation of an automatic change mechanism for slide projection connected at 70.

Figure 3:
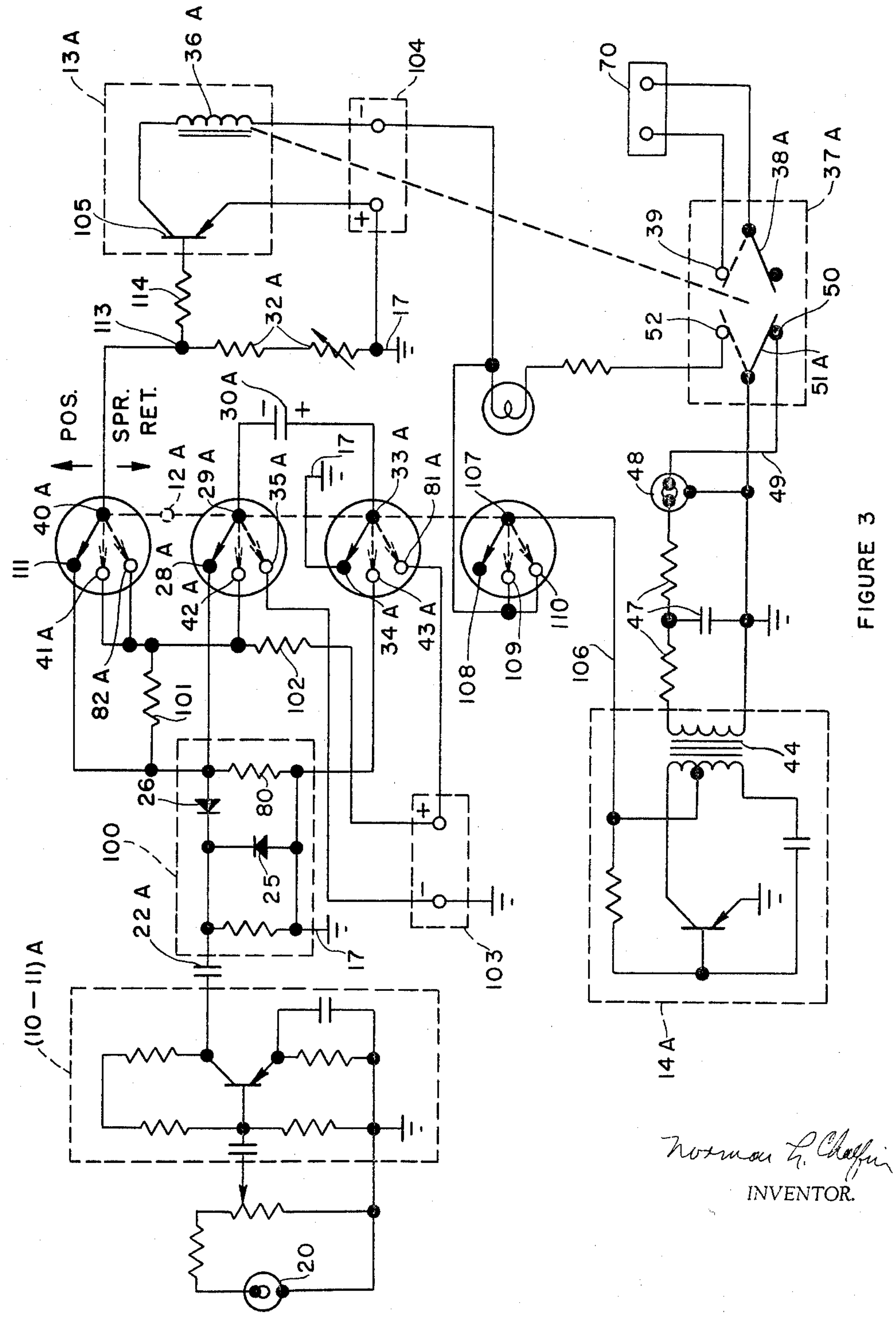
FIGURE 3 is a transistor circuit diagram, another embodiment of the invention.

A transistor form of the invention is shown in FIGURE 3. Whenever the elements of FIGURE 3 correspond functionally to those in FIGURE 1, the same number designation has been used with a letter "*a*" following so as to identify the element as a transistor counterpart. If the elements are the same in FIGURES 1 and 3 identical reference characters have been applied. Whereas in the vacuum tube embodiment of the invention described in FIGURE 1 the energized condition of the relay 36 is shown, in FIGURE 3 relay **36*a* is used in a normally de-energized condition. By appropriate bias reversal for capacitor 30 and application of potentials thereto of opposite polarities and by appropriate opposite connections of relay contacts 37 and diodes 25 and 26** the normally de-energized form of operation is possible with the circuit of FIGURE 1. The details of such connection once defined for one polarity can be made for opposite polarity by those skilled in this art.

Amplifier **10–11*a* is shown as a single transistor amplifier of conventional configuration. It may equally well be a two-stage amplifier if the signal levels involved require it. Amplifier 10–11*a* is coupled by capacitor 22*a* to a diode network 100 which includes elements 25, 26, 80 similar to those in FIGURE 1 and performing the same function, that is, in playback mode to rectify alternating signals received from amplifier 10–11*a* to provide a D.C. charge potential for capacitor 30*a*. The polarity of diodes 25 and 26 in FIGURE 3 is such as to provide a negative potential to capacitor 30*a*, in response to a signal applied at input 20. Transistor circuit 13*a* is a relay control stage. Under normal circumstances (no signal present) a positive bias is applied to base 105 through resistors 101 and 102 from bias supply 103. Collector voltage for transistor 13*a* is supplied from source 104. Since transistor 13*a* is a PNP type, the collector receives a negative potential and a positive bias on the base maintains the transistor non-conductive and so relay 36*a* is de-energized. When so de-energized relay contacts 37*a* make contact as shown by solid lines 51*a* and 38*a* shorting output 48** just as in the vacuum tube embodiment of FIGURE 3.

Transistor **14*a*** is an oscillator, same as that shown in FIGURE 5*b* of my U.S. Patent No. 3,110,216. The collector voltage lead 106 of transistor **14*a* goes to an added switch element 107 with contacts 108, 109, 110. Contact 108 is open. Contacts 109–110 are connected together to the negative supply source 104. When arm connection 107 is in POS. position (playback mode) no negative potential is applied to oscillator transistor 14*a* and it is inoperative. In either the "Record" position 107–109 or key position 107–110 oscillator 14*a*** is energized.

Switch elements **29*a* and 33*a* are connected to capacitor 30*a*, negative to 29*a*, and positive to 33*a*. In "Record" position 33*a*–43*a* terminals are closed; 29*a*–42*a* are closed and 40*a*–41*a* are closed, as well as 107–109 as previously mentioned. This results in (1) energization of capacitor 30*a* across resistor 32*a* and (2) relay transistor 13*a* base input junction 113 to resistor 102 which applies a small positive potential to base 105, making transistor 13*a* non-conductive when switch 12*a* is placed in the momentary SPR. RET. position (the "KEY" position), then contacts 40*a*–82*a*; 29*a*–35*a* and 33*a*–81*a* are made to maintain base junction 113 positive through resistor 102; capacitor 30*a* is connected across source 103 and charged therefrom. When the key is released charged capacitor 32*a* is connected so that its negative terminal is on base junction 113 through switch terminal 42*a* and positive terminal on ground at 17 through switch terminal 43*a*, thus making transistor 13*a* conductive and energizing relay 36*a* until the charge on capacitor 30*a* leaks off through resistor 32. The discharge time is $R \times C$ seconds. But R is a complex function of resistor 32 in parallel with resistor 114 and the base-emitter resistance of transistor 13***a*. This is further complicated from the analysis standpoint by the fact that the total negative charge on capacitor 30*a* is greater than the positive bias supplied through resistors 102 and 32*a* to base junction 113 and transistor 13*a* will cease conduction as soon as this charge falls to a value which approximately equals (in opposite polarity) the positive bias at 113. This time is adjustable by setting of the variable portion of 32*a*.

From the preceding description it may be seen that the invention can be operated on the basis of a normally deenergized relay circuit controlled as defined in this invention above by a signal which causes the relay to be energized or by a capacitor charged with appropriate polarity and discharged through the relay circuit to energize it.

Similarly the relay circuit may be energized and the signal or charged capacitor so arranged as to de-energize the relay circuit.

In either case the closure or open interval of the relay contacts is a function of the charge on the capacitor and a resistor is the circuit through which the capacitor discharges. The open or closure action does not begin until after the capacitor is appropriately charged and applied to the relay circuit in the record mode—the duration of closure may be extended beyond the signal duration in the playback mode.

There has been disclosed and described hereinabove a unitary instrument primarily intended for the actuation of an automatic electrically operated slide change mechanism in film strip or lantern slide projectors. The unitary instrument includes means for generating a tone signal of predetermined duration, the duration being settable by a control thereon and means for actuating the slide projector control mechanism in synchronism with the generation of the tone signal. The unitary instrument further includes a selection switch by which the device may be alternatively used as the tone generator above mentioned and as a responder to tones previously generated and recorded on magnetic tape or phonograph discs. In the tone generator use of the device of the invention, the oscillator output terminal 48 is normally connected to the recording signal input of a recording machine. In the responder use of the device of this invention the control tone input circuit 20 is normally connected to the output of a playback device for the recorded-upon medium used or to the output of a radio receiver if used in conjunction with a source of remotely generated signals broadcast to the device of this invention.

Also shown and described are both a vacuum tube and transistor circuit embodiment. It should be clear that other forms of solid state or vacuum circuit elements may be used as they become known to the art involved with such circuits.

From the above it may be readily seen that many variations of the use of the invention can be made without departing from the spirit and scope of its concept within the ambit of the claims hereinafter delineated.

What is claimed as new is:

1. In an automatic slide projector control mechanism for synchronizing the advance of slides in a slide projector with a concurrent sound program, the combination of:

a tone oscillator having an output circuit connected to an external recording mechanism, said oscillator being normally de-energized;

normally energized relay control means having charge storage means therein with adjustable time control means for the discharge thereof, said relay control means being de-energized when said charge storage means becomes charged;

said relay control means also having normally-open-when-energized contacts connected to said projector control mechanism and normally-closed-when-energized contacts connected to said oscillator output circuit to maintain said output circuit inoperative while said relay control means is energized;

a source of direct current potential;

a source of alternating signal current;

rectifying means connected to said source of alternating signal current to develop a charging potential whenever a signal is present in said last-named source; and selective switching means having a first positive connection position, a second positive connection position and a momentary position, said switch means being interconnected between said rectifier means, said source of direct current potential, said charge storage means and said oscillator, whereby in said first positive position of said switching means said rectifier is connected to said charge storage means to charge said charge storage means whenever a signal is present in said source of alternating signal current, to de-energize said relay control means to close said contacts connected with said projector control mechanism to advance a slide in the projector, and whereby in said second positive position of said switching means, said oscillator is energized, so that when said switching means is placed in momentary position thereof, said charge storage means is disconnected from said relay control means and is connected to said source of direct current potential to become charged and then reconnected to said relay control means when released from said momentary position to de-energize said relay control means thereby to open said normally closed contacts and render said oscillator output circuit operative to apply oscillations generated thereby to said external recording means while simultaneously closing said normally open contacts to operate said projector control mechanism, to advance a slide therein whereby a recording can be made of control tones generated by said oscillator at a time and in synchronism with other sound signals also recorded on said recording means, the duration of said de-energized condition of said relay control means being adjustable by said time control means.

2. The combination defined in claim 1 wherein said source of alternating signal current is an amplifier, also connected to said external recording mechanism.

3. In an automatic slide projector control mechanism the combination of:

a tone oscillator having an output circuit, connected to an external recording means;

normally energized relay control means having charge storage means therein responsive to a source of charging potential to become de-energized, and having normally-open-when-energized contacts connected to said slide projector control mechanism and normally closed when energized contacts connected to said output circuit of said oscillator to maintain said oscillator output circuit inoperative;

a source of direct current potential;

a source of alternating signal current;

rectifier means connected to said source of alternating signal current to develop a direct current charging potential whenever a signal is present in said last named source;

selective switching means having a plurality of contact positions, said switching means being interconnected between said rectifier means, said direct current source of said charge storage means and said oscillator, whereby in one contact position of said switching means said rectifier is connected to said charge storage means to charge said charge storage means whenever an alternating current signal is present in said source of alternating signal current, to operate said slide projector control mechanism and whereby when said switching means is in another contact position thereof said oscillator is energized, and whereby when said switching means is in a third position thereof, said charge storage means is disconnected from said relay control means and is connected to said source of direct current potential and then reconnected to said relay control means when released from said third position to de-energize said relay control means and render said oscillator output circuit operative to apply oscillations generated thereby to said external recording means while simultaneously operating said projector control mechanism, to advance a slide therein whereby a recording can be made of control tones of said oscillator in synchronism with other sound signals also recorded on said recording means.

4. In an automatic slide projector control mechanism the combination of:

oscillator means having a normally inoperative output circuit, normally energized relay control means having charge storage means therein responsive to a source of charging potential to become de-energized, and being connected to said automatic slide projector control;

a first source of charging potential;

a second source of charging potential;

selective switching means having a first and a second positive contact position and a momentary position, said switching means being interconnected between said first source of charging potential, said second source of charging potential, said charge storage means and said oscillator, whereby in said first positive contact position of said switching means to charge said charge storage means whenever a signal is present in said second source and whereby to operate said projection control when said switching means is in said second positive position said oscillator is energized, and when said switching means is placed in said momentary position thereof, said charge storage means is disconnected from said relay control means and is connected to said first source of charging potential and then reconnected to said relay control means when released from said momentary position to de-energize said relay control means and render said oscillator output circuit operative to apply oscillations generated thereby to said external recording means while simultaneously operating said projector control mechanism, to advance a slide therein whereby a recording can be made of control tones of said oscillator at a time synchronized with other sound signals also recorded on said recording means.

5. In an automatic slide projector control mechanism the combination of:

a tone oscillator having output circuit connected to external recording means;

relay control means having charge storage means therein responsive to a source of charging potential to render said relay means operative and having normally-open-contacts connected to said slide projector control mechanism and normally-closed contacts connected to said output circuit of said oscillator to maintain said oscillator output circuit inoperative while said relay control means is inoperative;

a source of direct current potential;

a source of alternating signal current;

rectifier means connected to said source of alternating signal current to rectify said alternating signal current to produce a charging potential; and selecting switching means having a plurality of contact positions, said switching means being interconnected between said rectifier means, said source of direct current, said charge storage means and said oscillator, whereby in one contact position of said switching means said rectifier is connected to said charge storage means to charge said charge storage means whenever charging potential is present in said alternating current source to operate said projector control mechanism in response to an occurrence of said alternating current and whereby in another position of said switch said oscillator is energized, so that when said switching means is momentarily placed in a third or momentary position thereof, said charge storage means is disconnected from said relay control means and is connected to said source of direct current charging potential and then reconnected to said relay control means when released from said momentary position to render said relay control means operative and render said oscillator output circuit operative to apply oscillations generated thereby to said external recording means while simultaneously operating said projector control mechanism, to advance a slide therein whereby a recording can be made of control tones of said oscillator at a time synchronized with other sound signals also recorded on said recording means.

6. In an automatic slide projector control mechanism the combination of:

oscillator means having a normally inoperative output circuit;

relay control means being responsive to a source of charging potential to become operative, and having contacts connected to said slide projector control mechanism and contacts connected to said output circuit of said oscillator to maintain said output circuit inoperative;

a source of direct current charging potential;

a source of alternating current charging potential;

rectifier means connected to said source of alternating current changing potential; and selective switching means being interconnected between said rectifier means, said direct current source of charging potential, said relay control means and said oscillator, whereby in one position of said switching means said rectifier is connected to said source of alternating current charging potential and whereby when said switching means is in another position thereof said oscillator is rendered operative and when said switching means is momentarily placed in a third position thereof, relay control means is connected to said source of charging potential and then reconnected to said relay control means when released from said momentary position to render said relay control means and said oscillator output circuit operative simultaneously to apply oscillations generated thereby to said external recording means while at the same time operating said projector control mechanism to advance a slide therein whereby a recording can be made of control tones of said oscillator at a time synchronized with other sound signals also recorded on said recording means.

7. For operating a slide projector in response to response to recorded signals, and recording said signals, a unitary mechanism to be connected with said slide projector and with a recording means, said unitary mechanism comprising:

signal generating means;

a control circuit means including a resistance and capacitance timing circuit therein, said control circuit means being connected to said signal generating means to operate said signal generating means for a predetermined time interval;

amplifier means responsive to signals from external sources;

rectifying means connected to said amplifier means to provide a control signal in response to said signals from external sources; and switching means connected to said signal generating means, said control circuit means and said rectifier means for selectively applying said respective signals to a recording means or to said control circuit means whereby said slide projector is operated simultaneously with said signals from said external sources or with said signal generating means.

8. In an automatic slide projector programmer
a means for generating a signal;
a circuit means including resistance-capacitance timing elements, said circuit means being connected with said means for generating a signal and being adapted for operating said means for generating a signal selectively for a predetermined time;
a control means for advancing the slides of a slide projector, said control means being also connected to said automatic means, and operable for the duration of said signal; and
selective switch means connected between said means for generating a signal, said circuit means and said control means for alternately selecting the time at which said slides shall be advanced and activating said resistance-capacitance timing elements to operate for said predetermined time.

References Cited by the Examiner

UNITED STATES PATENTS

| | | | |
|---|---|---|---|
| 2,787,669 | 4/1957 | Flan et al. | 88—28 X |
| 2,811,588 | 10/1957 | Julie | 88—28 X |
| 2,975,672 | 3/1961 | Shields | 179—100.2 X |
| 3,110,216 | 11/1963 | Chalfin | 88—28 |
| 3,177,767 | 4/1965 | Templeman | 88—28 |

NORTON ANSHER, *Primary Examiner.*

EVON C. BLUNK, *Examiner.*

V. A. SMITH, *Assistant Examiner.*